Figure 1:
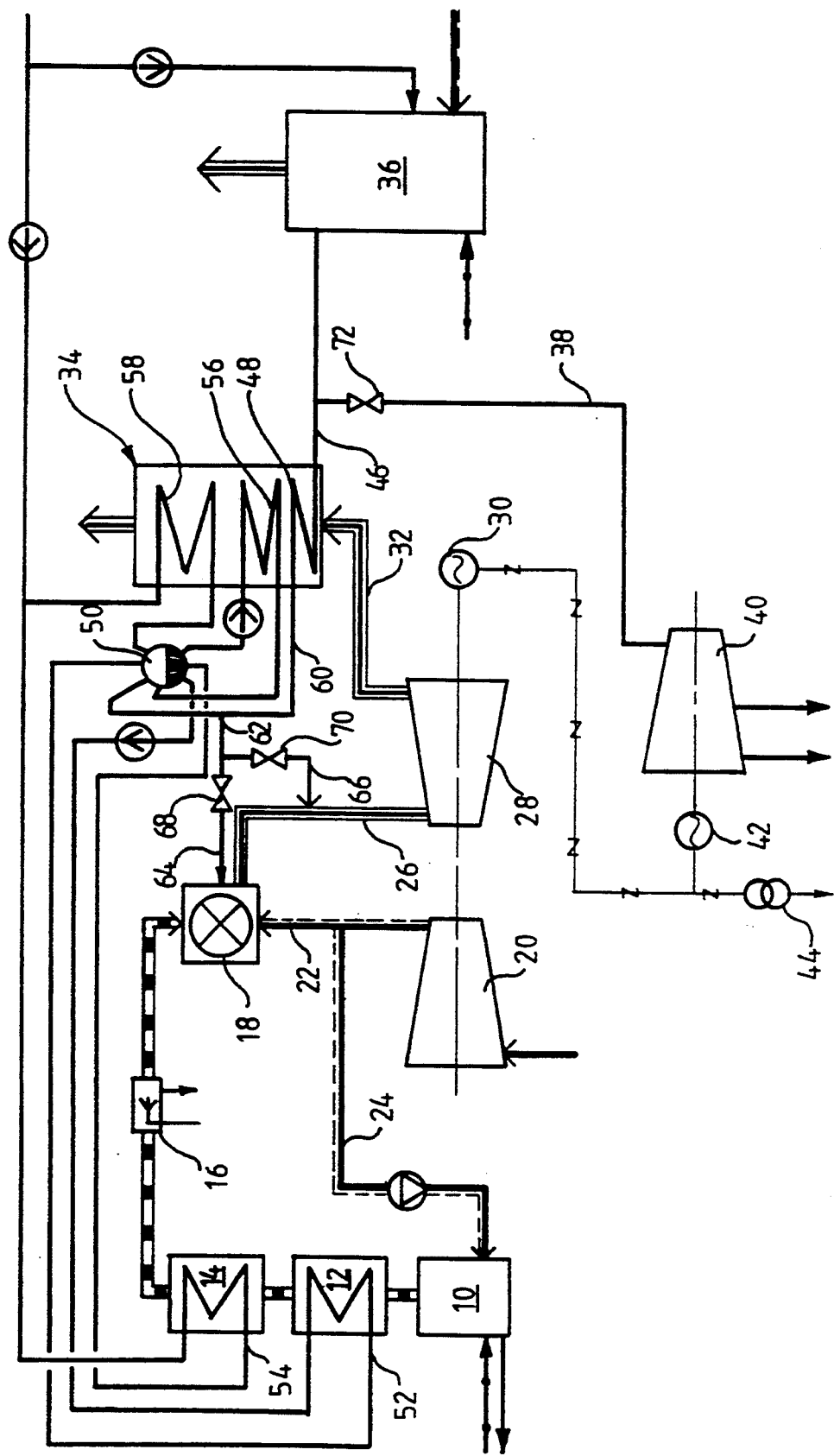

United States Patent [19]
Arpalahti et al.

[11] Patent Number: 5,370,772
[45] Date of Patent: Dec. 6, 1994

[54] METHOD FOR GENERATING HEAT AND ELECTRICITY IN A SULPHATE PULP MILL

[75] Inventors: Olli E. Arpalahti, Varkaus; Jukka Pekkinen, Savonlinna, both of Finland

[73] Assignee: A. Ahlstrom Corporation, Noormarkku, Finland

[21] Appl. No.: 927,320

[22] PCT Filed: Apr. 3, 1991

[86] PCT No.: PCT/FI91/00096
§ 371 Date: Sep. 30, 1992
§ 102(e) Date: Sep. 30, 1992

[87] PCT Pub. No.: WO91/15665
PCT Pub. Date: Oct. 17, 1991

[30] Foreign Application Priority Data
Apr. 3, 1990 [FI] Finland ............... 901669

[51] Int. Cl.⁵ .............................. D21C 11/04
[52] U.S. Cl. .................. 162/30.11; 162/30.1; 162/252; 60/39.05; 60/39.12; 60/39.182
[58] Field of Search ............... 162/30.11, 31, 47, 252; 60/39.05, 39.12, 39.182, 39.55, 39.53; 48/197.R, 203, 209

[56] References Cited
U.S. PATENT DOCUMENTS 4,682,985  7/1987  Kohl ........................... 162/30.11
4,785,622  11/1988  Plumley et al. .............. 60/39.12
4,872,950  10/1989  Anderson et al. ............. 162/47
4,969,324  11/1990  Woodson ..................... 60/39.05
5,201,172  4/1993  Hakulin et al. ............. 162/30.11

OTHER PUBLICATIONS

Ron McDonald, The Pulping of Wood, vol. 1, 1969, pp. 308–309.
Kolp et al, "World's First Full STIG TM LM5000 Installed at Simpson Paper Company" ASME Journal, Jun. 5–9, 1988, pp. 1–15.

Primary Examiner—W. Gary Jones
Assistant Examiner—Dean T. Nguyen
Attorney, Agent, or Firm—Nixon & Vanderhye

[57] ABSTRACT

A method and apparatus for generation of electricity by pressurized gasification of black liquor in a combined power plant. The gases produced in the gasification of black liquor are purified and introduced into a gas turbine for generating electricity. From the turbine, the gases are conducted to a waste heat boiler. High pressure steam generated in the waste heat boiler and or auxiliary boiler is introduced into a steam turbine to such an extent that the exhaust steam from the steam turbine covers the steam and heat demands of the pulp mill. The excess steam is introduced into the gas turbine or the combustor thereof for increasing the generation of electricity.

19 Claims, 3 Drawing Sheets

METHOD FOR GENERATING HEAT AND ELECTRICITY IN A SULPHATE PULP MILL

The present invention relates to a method and apparatus for generating heat and electricity by means of pressurized gasification of black liquor by using combined power plant technology in a sulphate pulp mill. Black liquor is gasified in a pressurized state in a gasifier by means of air pressurized in a compressor. The gases thereby produced are purified and combusted in a gas turbine combustor by means of pressurized air from the compressor. The exhaust gases formed in the combustor are expanded in the gas turbine for generation of electricity. From the gas turbine, the gases are further conducted into a waste heat boiler, where superheated high-pressure steam is generated, which is then expanded in a steam turbine for generation of electricity. Exhaust steam from the steam turbine is used to cover the heat demand of the pulp mill.

In a pulp mill, steam is usually also generated in an auxiliary boiler, where bark, wood waste or other fuel is combusted.

Production of sulphate pulp is the most important pulp making method in the world. Its share was about 58% of the pulp produced in 1987. Heat and electricity demands of sulphate pulp mills have continuously decreased during the past years as a result of development work and, today, sulphate pulp making is over self-sufficient with respect to energy or at least with respect to process heat.

In Finland, the average annual heat demand of a sulphate pulp process is about 10000 to 13000 MJ/tm and the average annual electricity demand about 1900 to 2900 MJ/tm. Both electricity and heat demands vary in accordance with seasons, i.e., outside temperatures. The difference between average nominal heat consumptions in winter and summer may be nearly 20% and between nominal electricity consumptions about 6%.

Energy is produced in a pulp mill mainly by combusting black liquor in a recovery boiler and wood wastes and bark in an auxiliary boiler. The bark of the wood raw material used in the process and the organic substance of generated black liquor together normally cover the whole energy demand. If more energy is needed, additional electricity or fuel may be purchased. The additional fuel is combusted with the bark in the auxiliary boiler.

Electricity is consumed in the cooking, washing, bleaching and evaporation plants primarily for pumping of black liquor, water and pulp and for transporting of chips. Furthermore, the dryer section consumes electricity for the drives and the ventilation in the section. Electricity is also consumed in lighting and in treatment of raw water and waste waters.

In a sulphate pulp process, heat is needed for inducing and increasing the velocity of desired process reactions. In the cooking plant, for example, heat is needed for heating the black liquor and the chip circulation systems. During the cooking process, the chips and the cooking liquor are heated to the cooking temperature indirectly with high pressure steam. The dryer section stands for approximately 29% of the heat consumption.

The evaporation plant is the greatest heat consumer of all separate processes. It stands for 31% of the entire energy consumption of a sulphate pulp mill. The secondary heat obtained from the evaporation plant is sufficient to produce warm water (40° C.) required by the sulphate pulp mill. The power plant in the pulp mill stands for about 18% of the electricity consumption and about 10% of the heat consumption.

Today, energy is produced in the following way: a recovery boiler and an auxiliary boiler, where waste bark from the mill is combusted, generate superheated high pressure steam. The steam hereby generated is forced through a back-pressure steam turbine/turbines and the steam released is used to cover the heat demand of the mill. The turbine and the generator connected thereto produce the electricity needed by the mill.

Electricity is usually generated by means of a back-pressure turbine provided with one or more bleed lines. The back-pressure is usually 3 to 4 bar and the bleeding pressure 10 to 13 bar. Electricity may also be generated by a condensing turbine.

There are different ways of generating steam and electricity when combusting both black liquor and bark. It is possible to have separate steam turbines for each boiler, whereby different degrees of superheating do not cause problems. A second alternative is to generate steams having the same degree of superheating in both boilers, which makes it possible to use only one steam turbine without any problems. A third alternative is to continue superheating of steams of lower superheating degrees in a second boiler, whereby the same degree of superheating is obtained for the various steams and only one steam turbine is needed. Today, the conversion efficiency in electricity generation is about 20% in the pulp mills.

The soda recovery boiler has developed into a reliable regeneration and energy production process, but its initial price is high, and the ratio of heat to electricity generated in a recovery boiler is disadvantageous in the sulphate pulp mills of today. The thermal demand is covered with recovery boilers better than before because the processes consume less heat, but electricity is generated with a poor conversion efficiency.

The recovery boiler is the most expensive single installation of the sulphate pulp process. This is due to the corrosion resistant materials used and the large size of the boiler. Boilers have to be large in size as the heat transfer is poor in comparison with conventional boilers, the flue gas volumes are large with respect to the thermal capacity obtained, and the boiler can very easily be clogged. The reason for poor heat transfer is fouling of heat surfaces caused by impurities in the flue gases. Large flue gas volumes are caused by water-bearing fuel. To prevent clogging, the heating tubes are disposed relatively far from each other, which then also makes the boiler larger.

The flue gas particles from the recovery boiler easily melt and adhere to the heat surfaces. To avoid the risk of corrosion caused by the high temperature and the risk of clogging, the superheating temperatures in the recovery boilers are lower than in other steam boilers, i.e., about 720 to 770 K. The fresh steam pressure is about 80 to 90 bar. As a result of low superheating temperature, the conversion efficiency in the generation of electricity in a steam turbine is low.

The aspects described above have given reason for long-term studies on how the conventional recovery boiler could be replaced by new processes. For the time being, a large number of alternatives are being researched. Common to the suggested new processes is to separate the regeneration and the energy production and to adapt the fuel produced to combined power plants.

Black liquor may be gasified in many different ways. Popular methods under investigation are, for example, solid phase gasification and molten phase gasification. The temperature of the gas produced in solid phase gasification is low, 850 to 950 K, in molten phase gasification it is higher, generally over 1150 K, and normally 1150 to 1300 K. Pressure does not have an essential impact on the temperature of the produced gas. Purified gas may be combusted either in a conventional boiler or in a pressurized combined process in order to generate steam and electricity.

In a molten phase gasification, smelt is formed in the reactor as in a recovery boiler. The smelt is treated in the same way as in a recovery boiler. Organic compounds are pyrolyzed and gasified, and they form a product gas together with water vapor.

In the solid phase gasification, the recovery of chemicals is effected at a low temperature. Solid sodium sulphide is produced when the temperature rises to a level in excess of 880 K and, theoretically, a 100% reduction is achieved at a temperature of 1020 K. The solid phase gasification of black liquor is based on a pyrolysis process, in which the residue is solid, and the evaporating substances form a gas. The solid residue is composed of inorganic compounds of sodium and sulphur, and of char. Char is gasified separately after the pyrolysis.

One of the most promising ideas is pressurized gasification of black liquor, which offers an opportunity of applying combined power plant technology in the power generation at the pulp mill. In the combined power plant process, gasified black liquor is used as a fuel and, if necessary, either oil, coal or natural gas besides bark is used as an additional fuel. The basic systems in the process are a gasifier, gas washer, gas turbine and waste heat boiler. The combined power plant is suitable for power generation in most of the new processes. Combusting gas in the gas turbine generates electricity and produces pressurized air for the combustion and gasification processes. In the waste heat boiler, electricity is generated in a steam turbine by steam generated by transferring heat from the exhaust gases of the gas turbine to the water-steam circulation, and process heat is generated by means of back-pressure.

It has been proved that generation of electricity and heat in a sulphate pulp mills varies considerably depending on the season and the wood raw material. Unless additional measures are taken, the heat generation of the mill does not, due to the above-mentioned variations, in all circumstances meet the demands.

The following table presents the quantities of excess heat generated in a sulphate pulp mill when the parameters are temperature, wood grade and pressure ratio of the gas turbine process.

TABLE 1

Excess heat in a sulphate pulp mill as a function of wood grade, pressure ratio and temperature.

| Wood grade | Temperature K | Pressure ratio | Excess heat MJ/tm |
| --- | --- | --- | --- |
| birch | 253 | 20 | 80 |
| pine | 253 | 20 | 1360 |
| birch | 273 | 20 | 830 |
| pine | 273 | 20 | 2160 |
| birch | 293 | 20 | 1660 |
| pine | 293 | 20 | 3040 |
| birch | 253 | 30 | 0 |
| pine | 253 | 30 | 1090 |
| birch | 273 | 30 | 640 |
| pine | 273 | 30 | 1940 |
| birch | 293 | 30 | 1520 |

TABLE 1-continued

Excess heat in a sulphate pulp mill as a function of wood grade, pressure ratio and temperature.

| Wood grade | Temperature K | Pressure ratio | Excess heat MJ/tm |
| --- | --- | --- | --- |
| pine | 293 | 30 | 2870 |

An object of the present invention is to provide a method of changing the ratio of the generation of heat to the generation of electricity in a sulphate pulp mill in such a manner that the sulphate pulp process would be electricity self-sufficient, and not generate more steam than required by the process.

Another object of the invention is to provide a better conversion efficiency in generation of electricity in a sulphate pulp mill without excess heat being generated simultaneously.

A further object of the invention is thereby, in addition to the raised electricity generation, to provide an equalization of heat consumption and heat generation.

To achieve the objects mentioned hereinabove, the method according to the invention of generating heat and electricity by means of pressurized gasification of black liquor by using combined power plant technology in a sulphate pulp mill is characterized in that
  an adjustable quantity of injection steam is introduced into a gas turbine;
  a quantity of steam, substantially corresponding to the heat consumption of the sulphate pulp mill in various conditions, i.e., the consumption of the exhaust steam from the steam turbine, is conducted through the steam turbine, and
  the quantity of excess steam generated in the combined power plant is transformed into electricity by injecting it as injection steam into the gas turbine.

Thus, a steam injection gas turbine provides a solution for adjusting the ratio of the generation of heat to the generation of electricity. Steam injection provides a way of improving the efficiency of the gas turbine. Steam is according to the invention conducted through the steam turbine in the pulp mill only to an extent corresponding to the heat consumption of the plant, and the excess steam is used, preferably entirely, as injection steam in the gas turbine for improving its efficiency. Thus, the plant is always in balance as to heat, and only the excess generation of electricity varies. By injecting steam, the generation of electricity may be considerably increased, whereby the pulp mill becomes, in a way, an electrical plant.

It is advantageous for the operation of the gas turbine if the amount of air compressed in the compressor is such that it maintains mainly a constant temperature and a constant mass flow in the gas turbine, irrespective of different quantities of injected steam. It is advantageous for the gas turbine efficiency to run the gas turbine with an even mass flow, the allowable variation being about 20% at most. For this throttling effect, many gas turbine systems are provided with a set of guide vanes disposed in the compressor.

Thus, the invention relates to a method of adjusting the heat generation in the sulphate pulp process to correspond to the heat consumption by injecting the excess steam into the gas turbine combustor or into the exhaust gas thereof. The invention provides a method, by means of which large quantities of steam may well be produced from waste heat and by cooling the product gas and also by combustion of bark, wood waste or other fuel because large quantities of excess steam flow not needed in the sulphate pulp mill may be injected into the gas turbine.

The injection steam injected into the gas turbine is preferably taken from the waste heat boiler, but in may also be taken from the steam system of the auxiliary boiler or from the steam system common to the waste heat and auxiliary boilers. Injection steam is injected either into the turbine combustor or into the exhaust gases released therefrom. The steam pressure has to be sufficiently high for successful injection into the pressurized gas.

In a process according to the invention, no special arrangements are needed in the waste heat boiler because the exhaust gases from the gas turbine are clean. If necessary, for example, for improving the superheating of steam, the boiler may be provided with combustors for combusting also purchased fuel in addition to the gas produced in the mill's own process. In a combined power plant, fresh steam may be superheated to a higher degree than in a recovery boiler because, in the combined power plant, the exhaust gases are purified prior to the gas turbine and there will be no problems caused by dirty gases.

Especially, the invention provides a method of changing the ratio of the generation of heat to the generation of electricity in a sulphate pulp mill in accordance with the prevailing conditions and on the basis of different process parameters. Conditions are changed, for example, by the outside temperature (season), wood grade and dry solids content of the black liquor to be gasified. The choice of the gas turbine has an impact on the conversion efficiency in the generation of electricity and on the electricity/heat ratio because that defines the gas temperature prior to the turbine and the pressure characteristics of the turbine.

The pressure characteristics of the gas turbine is an important parameter. An increase in the pressure ratio causes lowering of the temperature of the exhaust gases from the gas turbine if the other parameters, excluding the pressure ratio, are kept constant. This results in a lower pressure and temperature of the fresh steam and, consequently, less electricity is produced by the steam turbine. As the pressure ratio increases, more electricity is generated by the gas turbine because the temperature of the exhaust gases will be lower.

The turbine vanes of the gas turbine do not endure high temperatures. Therefore, the flue gas has to be cooled prior to the turbine. Generally, cooling is effected by mixing air surplus with the combustion gases. A drawback of this method is an increased amount of air passing through the compressor, which decreases the conversion efficiency in the generation of electricity in the gas turbine. The quantity of cooling air may be decreased by replacing it with injection steam. Thus, the conversion efficiency in the generation of electricity in the gas turbine is also improved. The temperature of the flue gases prior to the turbine is nowadays 1350 to 1500 K. Higher temperatures would be achieved with ceramic vanes. Raising the inlet temperature of the turbine means that the air coefficient becomes smaller, i.e., less combustion air is needed. Thereby, the power requirement of the compressor becomes lower. The benefit gained in the conversion efficiency in the generation of electricity and in the quantity of heat used by the process determines whether the investment in these special arrangements is profitable. The temperature has impact, through the temperature of the exhaust gases, on the pressure and temperature of the fresh steam and further on the generation of electricity and heat.

The heat demand of the sulphate pulp process varies depending on the outside temperature and, consequently, causes fluctuations in the mass flow passing through the steam turbine and in the quantity of injection steam. Variations of the outside temperature also changes the temperature of the air entering the compressor and the composition of the product gas obtained from the gasifiction stage.

The dry solids content of the black liquor to be gasified has an impact on the composition and heat value of the product gas obtained from the gasification stage. An increase in the dry solids content also adds to the generation of heat in the combustion of black liquor. The dry solids content of the black liquor is also of great significance to the operation of the evaporation plant and other equipment for black liquor treatment. An increase in the dry solids content adds to the heat consumption in the evaporation plant due to the greater amount of water that has to be evaporated and also due to the fouling of the evaporation stages and due to changes in the properties of black liquor. Furthermore, changes in the properties of black liquor affect consumption of electricity. The quantity of additional heat generated, however, considerably exceeds the quantity of additional heat needed for the evaporation.

The basis for the method according to the invention is, therefore, to generate process heat only to such an extent which is necessary for the sulphate pulp process. If the heat consumption of the process is lower than the produced heat amount, the excess steam is injected into flue gases. The quantity of steam generated by the waste heat boiler and the auxiliary boiler may be calculated relatively simply when the temperature range of the boiler as well as the temperature and pressure of the desired fresh steam are known.

In consideration of the above-mentioned parameters, the quantity of heat needed in the pulp mill as well as the corresponding quantity of high pressure steam may be calculated. The difference between the produced and consumed quantities of high pressure steam defines the quantity of injection steam. The conversion efficiency of the generation of electricity may be calculated on the basis of the electric efficiency produced by the steam and gas turbines.

Injection of steam into the combustion gas entering the gas turbine lowers the temperature of the combustion gas. Thus, prerequisite for maintaining the temperature of the gas entering the gas turbine constant is that the amount of air compressed through the compressor is throttled in proportion to the injected steam. In several gas turbines, a set of adjustable guide vanes is disposed in the compressor. The output from the compressor may be adjusted by means of such vanes. An economic adjustment range is rather narrow, from 80 to 100%. However, it has been established that this adjustment range is well sufficient in methods according to the invention. In the range of −20° C. to +20° C. of the outside temperature, the adjustment range is almost exactly the above-mentioned 80 to 100% if the mill production is constant. In mills running mere softwood pulp or mere birch pulp, the range is narrower, from 86 to 100%. With birch pulp, the nominal production of the mill is, however, about 17% higher than with softwood pulp because of the higher yield of the pulp. This does not, however, change the range of air flow of the compressor; only the minimum and the maximum are changed. With the same production rate and with different wood grades, the minimum amount of air through the compressor is needed for production of birch pulp when the outside temperature is high (+20° C.). If the production rate is 17% higher with birch pulp as mentioned above, the minimum amount of air compressed through the compressor will increase and it will be reached in running softwood pulp when the outside temperature is high.

In practice, the pulp mills always operate at the maximum capacities if the market situation so allows. The production of the mill is higher with birch than with softwood pulp. In certain conditions, when operating at a partial capacity, difficulties may arise in balancing the generation and consumption of heat when the total adjustment range of the compressor at full speed is needed for compensating the changes in wood grades and outside temperatures. With only one wood grade, this difficulty is much smaller, especially, if the mill is located in such an area where the outside temperature is relatively stable.

The invention is further described in greater detail in the following, with reference to the accompanying drawings, in which FIG. 1 is a schematic illustration of a combined power plant process in a sulphate pulp mill according to the invention, FIG. 2 indicates the amount of injected steam as a function of the outside temperature, FIG. 3 indicates the amount of air compressed through a compressor as a function of the outside temperature, and FIG. 4 indicates the conversion efficiency of the generation of electricity as a function of the outside temperature.

FIG. 1 is a flow sheet of a combined power plant connected to a sulphate pulp mill, in which energy is produced by means of the method according to the invention. Black liquor is gasified in a gasifier 10, wherefrom hot gases are introduced into product gas coolers 12 and ]4 for cooling the gas to a temperature suitable for gas purification. From the coolers, the gases are further conducted to a gas purifier 16, where the gases are purified sufficiently for the operation of the gas turbine.

The purified gases are introduced into a gas turbine combustor 18, where they are combusted to form hot, pressurized exhaust gas. Pressurized combustion air is introduced into the combustor from a compressor 20 via duct 22. Duct 24 leads air from the compressor also to the gasifier 10. The amount of the feed air may be regulated, for example, by adjusting the vanes of the compressor. The amount of air entering the combustor is so adjusted in accordance with the other process parameters as to maintain the temperature of the exhaust gas entering the gas turbine and preferably also the mass flow nearly constant.

The exhaust gases from the combustor are conducted via duct 26 into a gas turbine 28, which generates electricity in an electric generator 30. The compressor 20 is mounted on the same shaft with the gas turbine so that the gas turbine or a section thereof also drives the compressor. The exhaust gases from the gas turbine are conducted via duct 32 into a waste heat boiler 34, where the heat contained in the gases is recovered in the form of superheated high pressure steam.

The steam/water system of the waste heat boiler comprises the following parts: water preheater 58 into which the feed water is introduced, evaporator 56, steam drum 50 and superheater 48.

The heat released in cooling the product gas from the gasifier is also transferred via pipelines 52 and 54 preferably to the steam circulation system. In the example of the FIG. 1, it comprises gas coolers, i.e., a preheater 14 for the feed water and an evaporator 12. The feed water entering the boiler branches into two partial flows, one of them flowing into the actual waste heat boiler and the other into the product gas cooler. The evaporators 56 and 12 are shown in the diagram as forced-circulation heat surfaces, i.e., pump circulation heat surfaces. The superheated steam generated by the waste heat boiler is introduced via pipelines 46 and 38 into a steam turbine 40, and a generator 42 connected thereto produces electricity by means of the energy released in the expansion of steam.

Part of the high pressure steam generated in the waste heat boiler is conducted via ducts 62 and 64 into the gas turbine combustor 18 and/or via ducts 62 and 66 into the duct 26 leading directly into the gas turbine. The steam feed into the combustor and/or to the gas turbine may be regulated by valves 68 and 70 so that, preferably the steam surplus of the entire system is utilized as injection steam.

In the arrangement according to FIG. 1, a boiler 36 of bark, wood waste or other fuel, or a so-called auxiliary boiler, producing high pressure steam, is connected with a combined power plant. The steam received from the auxiliary boiler is connected with the steam coming from the waste heat boiler and is further conducted via duct 38 into the steam turbine 40. Electricity generated by generators 30 and 42 is connected to a common electrical network 44.

By means of valve 72 in the duct 38 leading to the steam turbine, the quantity of steam entering the turbine is regulated so as to always meet the thermal demand of the mill and to utilize the steam surplus in the generation of electricity.

Figure 2:
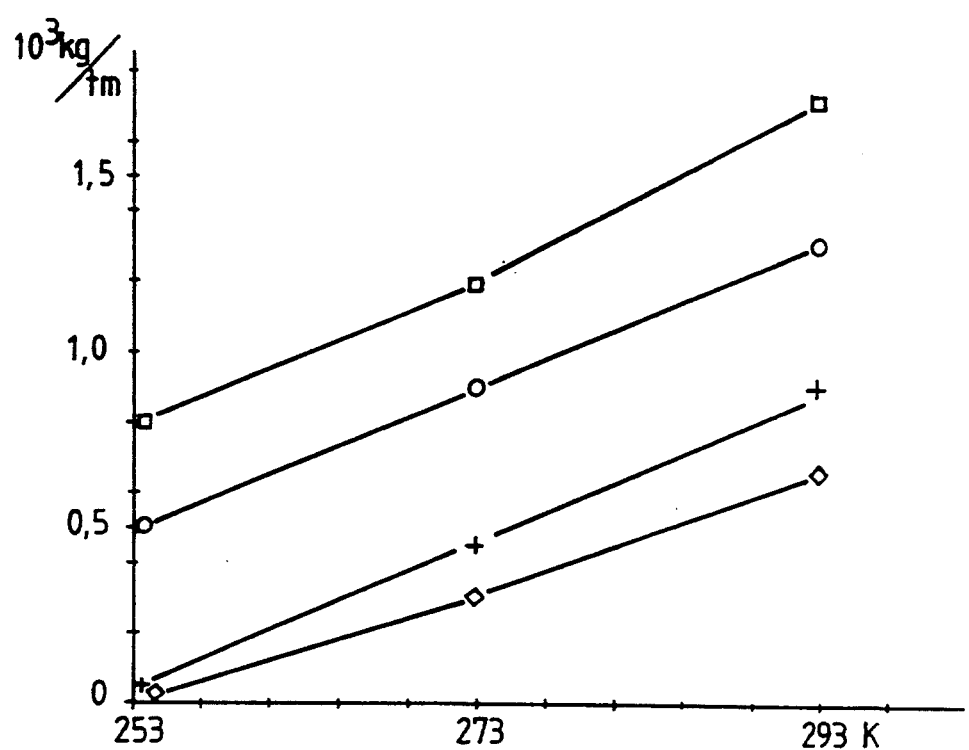
Figure 3:
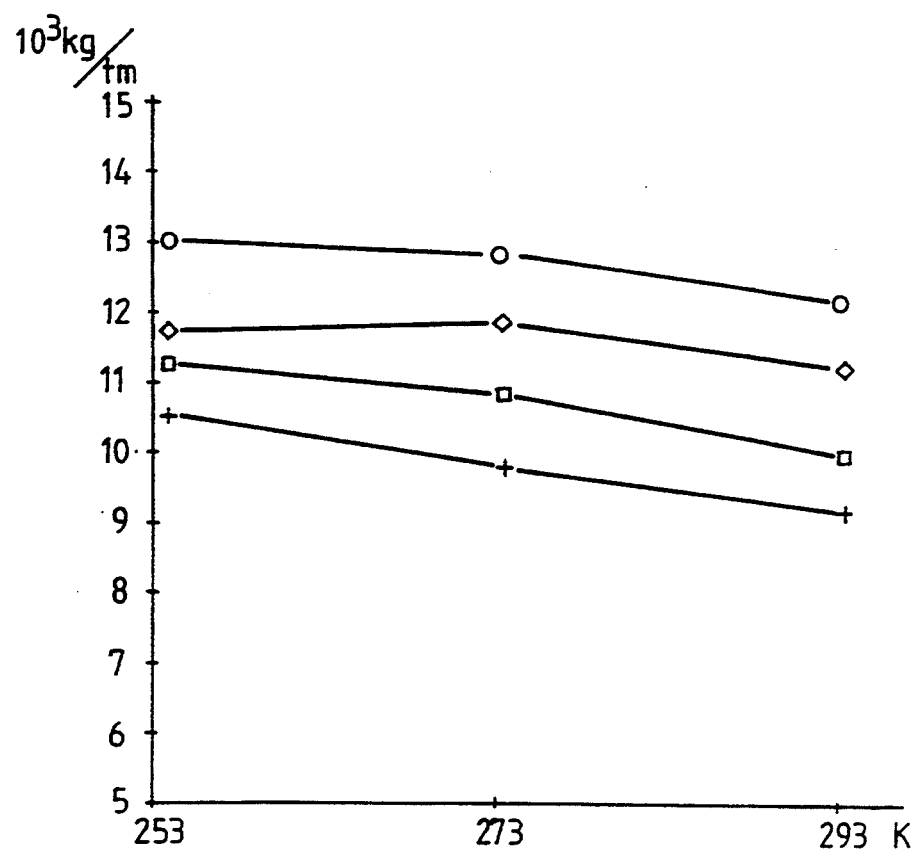
Figure 4:
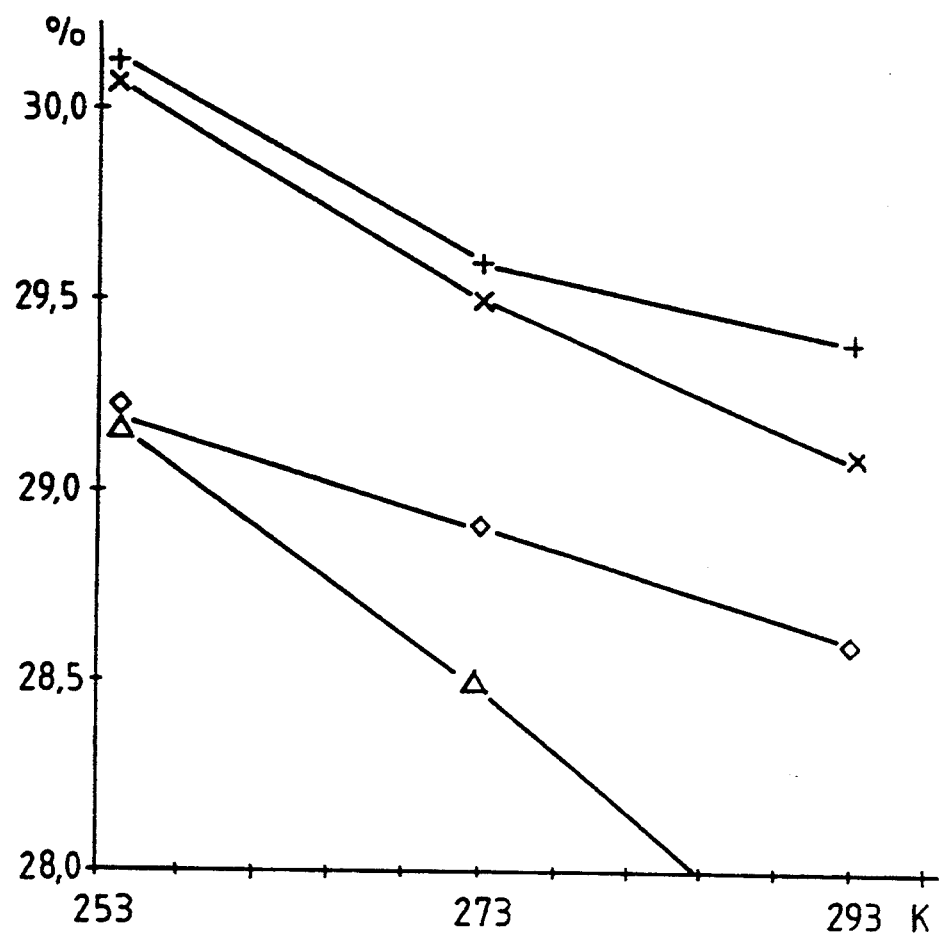

FIGS. 2–4 illustrate the dependency of the quantity of injection steam, quantity of air flowing through the compressor, and the conversion efficiency of the generation of electricity on the outside temperature. The FIGS. also indicate the effect of pressure ratio and wood grade on the above-mentioned quantities of steam and air as well as on the yield. In the calculations of the examples, it is assumed that the dry solids content of the black liquor is 75% and the inlet temperature of the gas entering the turbine is 1473 K.

FIG. 2 shows the values of Table 2, i.e. the dependency of the quantity of injection steam on the outside temperature. Changing of the quantity of injection steam is calculated for two different pressure ratios, 20 and 30, for mills producing either birch pulp or pine pulp. The generation of steam increases when the outside temperature rises, which means in a sulphate pulp mill that the quantity of injection steam increases.

TABLE 2

Dependency of injection steam on temperature.

| Wood grade | Temperature K | Pressure ratio | Injection steam $10^3$ kg/tm |
|---|---|---|---|
| pine | 253 | 20 | 0.8 |
| pine | 273 | 20 | 1.2 |
| pine | 293 | 20 | 1.7 |
| birch | 253 | 20 | 0 |

TABLE 2-continued

Dependency of injection steam on temperature.

| Wood grade | Temperature K | Pressure ratio | Injection steam $10^3$ kg/tm |
|---|---|---|---|
| birch | 273 | 20 | 0.45 |
| birch | 293 | 20 | 0.9 |
| pine | 253 | 30 | 0.5 |
| pine | 273 | 30 | 0.9 |
| pine | 293 | 30 | 1.3 |
| birch | 253 | 30 | 0 |
| birch | 273 | 30 | 0.3 |
| birch | 293 | 30 | 0.65 |

Changes in the amount of the air compressed through the compressor is an important parameter for the operation of the process. If the amount of air changes drastically, the regulation of the compressor is not possible by adjusting the guide vanes. According to literature, economic adjustment of the guide vanes is possible if the changes in the amount of air are 80 to 100%. The gas turbine may probably be run even though the amount of air compressed through the compressor is not adjusted according to changes in steam injection. In this case, the temperature of the combustion gas entering the turbine changes and, more specifically, it decreases when the steam injection increases. Consequently, the conversion efficiency in the generation of electricity also lowers.

FIG. 3 shows the values of Table 3 of how the amount of air changes in a sulphate pulp mill according to the outside temperature, wood grade and pressure ratio. FIG. 3 indicates that the changes in the amount of air are below 20% when the outside temperature and wood grade are changed.

TABLE 3

Dependency of amount of air fed into a compressor on temperature.

| Wood grade | Temperature K | Pressure ratio | Amount of air $10^3$ kg/tm |
|---|---|---|---|
| pine | 253 | 20 | 11.2 |
| pine | 273 | 20 | 10.5 |
| pine | 293 | 20 | 10 |
| birch | 253 | 20 | 10.5 |
| birch | 273 | 20 | 9.8 |
| birch | 293 | 20 | 9 |
| pine | 253 | 30 | 13.2 |
| pine | 273 | 30 | 12.8 |
| pine | 293 | 30 | 12.2 |
| birch | 253 | 30 | 11.7 |
| birch | 273 | 30 | 11.9 |
| birch | 293 | 30 | 11.2 |

FIG. 4 shows the values of Table 4 of the effect of injection steam on the conversion efficiency of the generation of electricity in a bark-combusting birch sulphate pulp mill. As a result of the rise in the outside temperature, the heat demand of the process decreases, whereby the mass flow passing through the steam turbine is reduced and the electric power produced by the steam turbine is reduced. In the same time, however, the electric power produced by the gas turbine increases if injection steam is used. A rise in the outside temperature reduces the heat volume of the product gas. The mutual effect of these aspects is appreciated in FIG. 4, which indicates that the conversion efficiency of the generation of electricity decreases when the outside temperature rises, irrespective of the pressure ratio and wood grade. Consequently, the same quantity of steam generates more electricity in a steam turbine than as the injection steam in a gas turbine. If injection steam is not utilized, the conversion efficiency when generating electricity decreases much more drastically.

TABLE 4

Effect of injection steam on the conversion efficiency of the generation of electricity.

| Pressure ratio | Steam injection | Temperature K | Conversion efficiency % |
|---|---|---|---|
| 20 | yes | 253 | 31 |
| 20 | yes | 273 | 29.6 |
| 20 | yes | 293 | 29.4 |
| 20 | no | 253 | 31 |
| 20 | no | 273 | 29.5 |
| 20 | no | 293 | 29.1 |
| 30 | yes | 253 | 29.2 |
| 30 | yes | 273 | 28.9 |
| 30 | yes | 293 | 28.6 |
| 30 | no | 253 | 29.2 |
| 30 | no | 273 | 28.5 |
| 30 | no | 293 | 27.7 |

An increase in the pressure ratio in such a manner that the temperature of the gas entering the turbine does not change, results in that the temperature of the gas discharged from the turbine and led into the waste heat boiler decreases. Thus, also the achieved superheating degree of the steam lowers, and it is more advantageous to construct the boiler in accordance with a lower steam pressure. A lowered superheating degree, however, lowers the conversion efficiency in the generation of electricity in the steam circulation system, which is appreciated from the figures of Table 4.

Effect of the dry solids content of black liquor on the conversion efficiency of the generation of electricity is contrary. An increase in the conversion efficiency, when the dry solids content grows, is caused by the increase in the heating value of the gas. In a sulphate pulp mill, an increase in the dry solids content of black liquor results in an increase in the quantity of injection steam and in a decrease in the amount of air compressed in the compressor, irrespective of the increased heat value of the product gas. When the dry solids content is increased, the mass flow passing through the steam turbine is also increased as the heat consumption of the process increases.

An increase in the dry solids content of black liquor increases the flue gas flow, whereby the generation of electricity by the gas turbine increases, and the waste heat boiler generates more steam, i.e., the generation of electricity also in the steam turbine increases. Thus, the more the dry solids content increases, the more excess electricity is generated.

A power plant process according to the invention provides a better conversion efficiency of the generation of electricity in comparison with a recovery boiler. Usually, more electricity is generated than what is needed in the sulphate pulp mill. The sulphate pulp mill is thermally self-sufficient. The invention is especially suitable for nordic conditions, where seasonal variations and different wood grades in mill processes are typical.

It is not intended to limit the invention to the embodiment of FIG. 1, but it may be modified and applied within the inventive scope defined by the accompanying claims. Thus, for example, it is not necessary to combust bark in a separate auxiliary boiler. Dried bark may also be gasified in a pressurized gasifier, whereafter the produced gas is purified and, if necessary, cooled prior to leading it into the gas turbine combustor together with the gas received from the gasification of black liquor, either separately or mixed therewith.

Bark and black liquor may possibly be gasified in one and the same means, but then, it has to be possible to separate inorganic substances harmful to the sulphate pulp process from the smelt or green liquor produced in the gasifier.

By gasifying bark in a pressurized state, the conversion efficiency of the generation of electricity may be further increased, but then, adequate production of heat has to be attended to. Use of steam injection for balancing the generation and consumption of heat is naturally possible. Integration of pressurized gasification of bark with a pressurized black liquor process will be very interesting if the heat consumption of pulp mills can be further lowered in the future.

We claim:

1. A method of generating heat and electricity by pressurized gasification of black liquor, using combined power plant technology in a sulphate pulp mill having steam requirements, including a compressor, gas turbine, gas turbine combustor, steam turbine, and waste heat boiler, comprising the steps of:
   (a) compressing air in the compressor;
   (b) gasifying black liquor from the sulphate pulp mill in a pressurized state using the compressed air;
   (c) purifying the gases formed in the practice of step (b);
   (d) combusting the purified gases from step (c) in the gas turbine combustor;
   (e) expanding the combustion gases produced in the combustor in the gas turbine to generate electricity;
   (f) discharging gases from the gas turbine into the waste heat boiler;
   (g) generating superheated high pressure steam in the waste heat boiler;
   (h) dividing and regulating the high pressure steam from step (g) into first and second streams:
   (i) expanding the first stream of high pressure steam in the steam turbine to generate electricity and to produce exhaust steam;
   (j) injecting the second stream of high pressure steam into the gas turbine or the gas turbine combustor to enhance the amount of electricity produced by the gas turbine; and
   wherein step (h) is practiced to regulate the amount of steam in the first stream so that the exhaust steam from the steam turbine is of sufficient volume and heat content to supply substantially all of the steam requirements of the sulphate pulp mill, but substantially no excess, and to direct substantially all of the rest of the high pressure steam into the second stream to practice step (j).

2. A method as recited in claim 1 further practiced using an auxiliary boiler which generates high pressure steam, and wherein step (h) is further practiced so that the total amount of steam from the auxiliary boiler and generated in step (g) is passed into one or both of the first and second streams.

3. A method as recited in claim 2 wherein the steam from the auxiliary boiler is passed to the steam turbine, and step (h) is practiced to take into account the amount of steam passed from the auxiliary boiler to the steam turbine when dividing the steam flow from step (f) into the first and second streams.

4. A method as recited in claim 3 wherein step (a) is practiced to adjust the amount of air so as to maintain the temperature of the gas turbine essentially constant regardless of the amount of injection steam provided in step (j).

5. A method as recited in claim 3 wherein steps (a) and (h) are regulated and practiced in dependence upon the ambient temperature just outside the pulp mill.

6. A method as recited in claim 3 wherein steps (a) and (h) are regulated and practiced in dependence upon the nature of the cellulose raw material used in the pulp mill.

7. A method as recited in claim 3 wherein the auxiliary boiler uses at least one of wood waste and bark as fuel.

8. A method as recited in claim 2 wherein steps (a) and (h) are regulated and practiced in dependence upon the dry solids content of the black liquor being gasified in step (b).

9. A method as recited in claim 2 wherein the steam from the auxiliary boiler is used as in the second stream.

10. A method as recited in claim 2 further utilizing steam conducting conduits defining the first and second streams, with valves disposed therein; and wherein step (h) is practiced by controlling the valves to control the amount and source of steam being fed into the first and second streams.

11. A method as recited in claim 2 wherein the auxiliary boiler used at least one of wood waste and bark as fuel.

12. A method as recited in claim 2 wherein step (a) is practiced to adjust the amount of air so as to maintain the temperature of the gas turbine essentially constant regardless of the amount of injection steam provided in step (j).

13. A method as recited in claim 2 wherein steps (a) and (h) are regulated and practiced in dependence upon all of the ambient temperature just outside the pulp mill, the nature of the cellulose raw material used in the pulp mill, and the dry solids content of the black liquor being gasified in step (b).

14. A method as recited in claim 1 wherein step (a) is practiced to adjust the amount of air so as to maintain the temperature of the gas turbine essentially constant regardless of the amount of injection steam provided in step (j).

15. A method as recited in claim 1 wherein steps (a) and (h) are regulated and practiced in dependence upon the ambient temperature just outside the pulp mill.

16. A method as recited in claim 1 wherein steps (a) and (h) are regulated and practiced in dependence upon the nature of the cellulose raw material used in the pulp mill.

17. A method as recited in claim 1 wherein steps (a) and (h) are regulated and practiced in dependence upon the dry solids content of the black liquor being gasified in step (b).

18. A method as recited in claim 1 further utilizing steam conducting conduits defining the first and second streams, with valves disposed therein; and wherein step (h) is practiced by controlling the valves to control the amount and source of steam being fed into the first and second streams.

19. A method as recited in claim 1 wherein steps (a) and (h) are regulated and practiced in dependence upon all of the ambient temperature just outside the pulp mill, the nature of the cellulose raw material used in the pulp mill, and the dry solids content of the black liquor being gasified in step (b).

* * * * *